United States Patent [19]
Svejkovsky et al.

[11] Patent Number: 6,079,548
[45] Date of Patent: Jun. 27, 2000

[54] DIFFERENTIAL IMPULSE CONVEYOR AND METHOD

[76] Inventors: Paul A. Svejkovsky, Rte. 2, Box 338-A, Marquez, Tex. 77865; John Silvester, Upper MT. Gravatt, QLD 4122 Brisbane, Australia

[21] Appl. No.: 09/134,888

[22] Filed: Aug. 14, 1998

Related U.S. Application Data

[62] Division of application No. 08/616,448, Mar. 15, 1996, Pat. No. 5,794,757.

[51] Int. Cl.$^7$ .................................................. B65G 27/10
[52] U.S. Cl. .................................. 198/750.8; 198/750.1; 198/766
[58] Field of Search .................................. 198/750.8, 766, 198/750.1, 770; 414/415, 525.7, 375

[56] References Cited

U.S. PATENT DOCUMENTS

| | | | |
|---|---|---|---|
| 3,332,293 | 7/1967 | Austin et al. | 198/770 X |
| 3,587,827 | 6/1971 | Schoen | 198/750.1 X |
| 3,817,370 | 6/1974 | Cox | 198/766 X |
| 5,178,258 | 1/1993 | Smalley et al. | 198/750.8 X |
| 5,404,996 | 4/1995 | Durnil | 198/766 X |

FOREIGN PATENT DOCUMENTS

| | | | |
|---|---|---|---|
| 208766 | 9/1959 | Australia | 198/766 |
| 893026 | 7/1949 | Germany | 198/766 |

*Primary Examiner*—Frank E. Werner
*Attorney, Agent, or Firm*—Browning Bushman

[57] ABSTRACT

A differential impulse conveyor 10, 80, 90, 100 includes a tray 12 which is driven in a forward direction at a slow speed and a backward direction at a higher speed to slide goods with respect to the tray and thereby move goods along the tray. The drive motor 26, 27 powers the tray in the forward and backward directions through a drive shaft 40 and a tray crank 66, 106 interconnecting the drive shaft and the tray. Controller 84 is provided for varying the rotational speed of the motor shaft, thereby avoiding mechanical knock in the drive system. In another embodiment, a pair of counterweights 52, 62 are provided on opposing sides of the drive shaft 40, with respective counterweight cranks 46, 56 initiating forward movement of each counterweight at a preselected offset angular position with respect to forward movement of the tray. The differential impulse conveyor and method of the present invention substantially eliminates mechanical knocking in the drive system, thereby extending the useful life of the conveyor and minimizing the size of the conveyor components.

21 Claims, 3 Drawing Sheets

DIFFERENTIAL IMPULSE CONVEYOR AND METHOD

This application is a division of Ser. No. 08/616,448 filed Mar. 15, 1996 and now U.S. Pat. No. 5,794,757.

FIELD OF THE INVENTION

The present invention relates to a differential impulse conveyor for moving goods along the conveyor tray. More particularly, this invention relates to an improved drive mechanism for powering a differential impulse conveyor in a manner that reduces undesirable vibration and mechanical knock in the drive mechanism and the conveyor tray.

BACKGROUND OF THE INVENTION

A differential impulse conveyor includes a generally elongate horizontal or slightly inclined tray or pan having a planar surface for transporting goods thereon. The tray is moved slowly forward to convey the goods with respect to the tray and is then pulled rearward at a high return speed so that the goods slide along the tray, thereby effectively transporting the goods along the conveyor tray. Differential impulse conveyors, which are sometimes referred to as linear motion conveyors, are operationally distinguishable from other types of conveyors, such as reciprocating conveyors, shuffle conveyors, vibrating conveyors, or shaker conveyors. A significant advantage of differential impulse conveyors is that goods may be transported along the unitary tray (no moving tray parts) in a manner that does not tend to damage fragile goods. Differential impulse conveyors have thus been preferred in many applications, such as food handling, when conveyor cleanliness, low noise, and minimal product damage are desired.

The drive mechanism of a differential impulse conveyor generates repeated acceleration and deceleration of the tray. Inherently the forward acceleration is lower than the rearward acceleration so that goods slide along the tray substantially only when the tray is pulled rearward at a high return speed. One type of prior art mechanism for driving a differential impulse conveyor includes a plurality of flywheels suspended from the conveyor tray such that the momentum of the rotating flywheels achieves the desired slow forward speed and high return speed for the conveyor tray. This flywheel drive mechanism is costly and cannot be easily optimized to adjust the ratio of the forward speed and return speed to achieve the desired product speed along the conveyor tray.

An improved differential conveyor is disclosed in U.S. Pat. No. 5,351,807 ('807 patent). The drive mechanism of this conveyor employs an angled universal joint in combination with a 1:2 speed enhancer to achieve one half cycle rotation of a drive shaft at a slow speed followed by one half cycle rotation of the drive shaft at a high speed. A crank interconnects the drive shaft and the tray to achieve the desired conveyor movement. The angle of the universal joint and the speed of the motor may be adjusted to maximize product travel along the conveyor tray. A counterweight is also driven by the drive shaft to move 180° out of phase with the conveyor tray movement, thereby substantially reducing undesirable conveyor vibration and mechanical knock in the drive system. A hydraulic fluid pump may also be driven by the drive shaft to serve a dampening function and further reduce knock in the drive mechanism.

Although the techniques disclosed in the '807 patent have significantly advanced the acceptance of differential impulse conveyors, improvements to further reduce or eliminate mechanical knock in the drive system are desired. Hydraulic dampening is not preferred for many food processing applications, wherein hydraulic fluid is avoided due to contamination and safety concerns. By further reducing mechanical knock in the drive mechanism, the size and thus the cost of conveyor drive components may be reduced without adversely affecting the useful life of the conveyor. In some applications, it may be desirable to drive the conveyor with a motor rotating a shaft at a speed much higher than the speed desired for the varying half cycle drive shaft. Optimization of the drive mechanism will further enhance acceptance of differential impulse conveyors as a practical alternative to reciprocating conveyors, shuffle conveyors, vibrating conveyors, and shaker conveyors.

Another problem with conveyors designed to move goods along a substantially horizontal surface of a tray by either differential impulse or vibration techniques concerns the difficulty with moving the pan so that the area beneath the tray may be easily cleaned. While the drive mechanism is typically detachable from the conveyor tray, a good deal of time and expertise is required to detach the drive mechanism from the tray, move the tray away from the drive mechanism for cleaning, then reattach the drive mechanism to the tray. Also, conveyor pans supplying goods to scales or weighers require precise positioning of the pan for optimal feeding of the scale or weigher. In order to reduce the time required for cleaning the area beneath the tray, the entire conveyor including the tray and drive mechanism have been movably supported on rails. The conveyor assembly weighing in excess of several thousand pounds may thus be rolled out along the rails for cleaning, then rolled back into its proper position with respect to the scale. Considerable expense is thus expended to move the conveyor for cleaning, then to properly reposition the conveyor with respect to the scale.

The disadvantages of the prior art are overcome by the present invention. An improved differential impulse conveyor and the drive mechanism for a differential impulse conveyor which desirably reduces mechanical knock are hereinafter disclosed. The drive mechanism optionally allows the motor shaft to be rotated at a speed much greater than the drive shaft, thereby reducing the cost of the conveyor drive mechanism.

SUMMARY OF THE INVENTION

The differential impulse conveyor includes a tray movable in a forward direction at a first speed and in a backward direction at a second speed greater than the first speed to move goods along the tray in the forward direction. In one embodiment of the invention, the conveyor drive mechanism includes a universal joint to convert substantially constant rotational motion of the motor shaft into varying rotational speed of a drive shaft, such that the drive shaft rotates at a slow speed during one half cycle of rotation and then a fast speed during the next half cycle of rotation. A crank is connected between the drive shaft and the tray to push the conveyor slowly forward and then pull the conveyor quickly backward. To reduce overrun knocking in the conveyor drive mechanism, two counterweights are provided, each movable relative to the tray. The tray and each counterweight may be pivotally supported from a base by pairs of generally vertical support arms. A corresponding plurality of counterweight cranks interconnect each counterweight with the drive shaft for initiating forward movement of the counterweights at an offset angular position of 120° with respect to initial forward movement of the tray.

In another embodiment of the invention, an electronic controller is provided for controlling the rotational speed of the motor shaft to cause the motor shaft to rotate at a first speed during a first rotational period and at a second speed greater than the first speed during a second rotational period of a duration equal to the first period. The controller and motor may be combined to be functionally and operationally equivalent to a programmed servo motor. By directly controlling the rotational speed of the motor shaft, the universal joint is not required. The motor shaft may be connected directly to a tray crank for moving the tray and to one or more counterweight cranks each interconnected with a respective counterweight. Alternatively, a torque multiplier or speed reducer may be provided between the motor shaft and the drive shaft for rotating the tray crank and the one or more counterweight cranks, thereby benefiting from a higher rpm and lower cost motor. In this latter embodiment, the torque multiplier preferably is a wormgear mechanism that has substantially zero backlash to accommodate the overrunning load.

A connector mechanism is provided for supporting the pan between pairs of support arms each pivotally connected to a base. When the conveyor is not powered, the connector mechanism may be released so that the pan may be slid laterally with respect to the support arms, thereby allowing for easy cleaning of the entire area normally beneath the tray. The tray may then be slid back into its original position and reconnected to the support arms. The connector mechanism further allows the lateral positioning of the pan to be easily adjusted with respect to the support arms and thus the conveyor base for desirably positioning the tray laterally with respect to a scale.

It is an object of the present invention to provide an improved differential impulse conveyor which minimizes mechanical knock due to overrun loads in the drive mechanism. It is a related object of the invention to provide a differential impulse conveyor that is relatively inexpensive and is not susceptible to high maintenance and repair costs.

A particular feature of the invention is the utilization of the plurality of counterweights, and preferably two counterweights, each driven by the drive shaft that drives the conveyor tray. A tray crank interconnects the drive shaft with the tray to initiate forward movement of the tray at a selected angular position of the drive shaft. Each counterweight is interconnected with the drive shaft by a counterweight crank that initiates forward movement of each counterweight at a preselected angular position of the drive shaft with respect to the selected angular position for initiating forward movement of the tray. Each counterweight preferably has a selected weight so that the maximum momentum of each counterweight is substantially equal to the maximum momentum of the tray.

It is another feature of the invention that a controller is utilized to control the rotational speed of the motor shaft to cause the motor shaft to rotate at a first speed during a first rotational period and at a second speed greater than the first speed during a second rotational period. The tray crank and one or more counterweight cranks may be directly connected to the varying speed motor shaft, or a torque converter (speed reducer) may be utilized between the varying speed motor shaft and the varying speed drive shaft for interconnection with both the tray crank and the one or more counterweight cranks. It is a further feature of the invention that the wormgear mechanism is utilized as the torque converter between the varying speed motor shaft and the drive shaft to minimize backlash and overrun loads on the drive shaft.

A further feature of the invention is that the drive mechanism for the differential impulse conveyor may be utilized to drive both a substantially horizontal tray, an inclined tray having a planar tray surface, or a vertically spiraling conveyor tray. Yet another feature of the invention is that the drive mechanism for the differential impulse conveyor may be easily modified to alter the speed at which goods are moved along the conveyor tray.

Still another feature of the invention is that an eccentric pulley rotated by the drive motor and a flexible belt interconnecting the eccentric pulley and the drive shaft may be used to achieve the desired varying speed of the drive shaft. The drive shaft rotates an eccentrically mounted tray crank which is connected to the tray, and one or more eccentrically mounted counterweight cranks each driving a respective counterweight. A make-up pulley or other eccentric compensator acts on the flexible belt to maintain the predetermined relationship between rotation of the drive shaft and the motor shaft.

Yet another feature of the invention is a connector mechanism for supporting a conveyor tray between pairs of spaced apart support arms each pivotally connected to a base. The connector mechanism allows the pan to be laterally moved out of position while still being supported on the support arms, so that the area beneath the tray may be easily cleaned. The connector mechanism also facilitates inspection and periodic adjustment or service of the conveyor drive mechanism. After cleaning, the tray may be easily slid back into its original position, and if necessary the lateral position of the tray may be easily adjusted.

It is an advantage of the present invention that the drive mechanism for the differential impulse conveyor is relatively simple and thus inexpensive to manufacture and easy to maintain. The cost of a drive mechanism is significantly reduced by providing relatively few drive mechanism components. If a plurality of counterweights are used to substantially reduce or eliminate knocking, the conveyor may be reliably driven by a conventional motor, a universal joint, and a 1:2 speed increase mechanism.

These and further objects, features, and advantages of the present invention will become apparent from the following detailed description, wherein reference is made to the figures in the accompanying drawings.

DETAILED DESCRIPTION OF THE PREFERRED EMBODIMENTS

Figure 1:
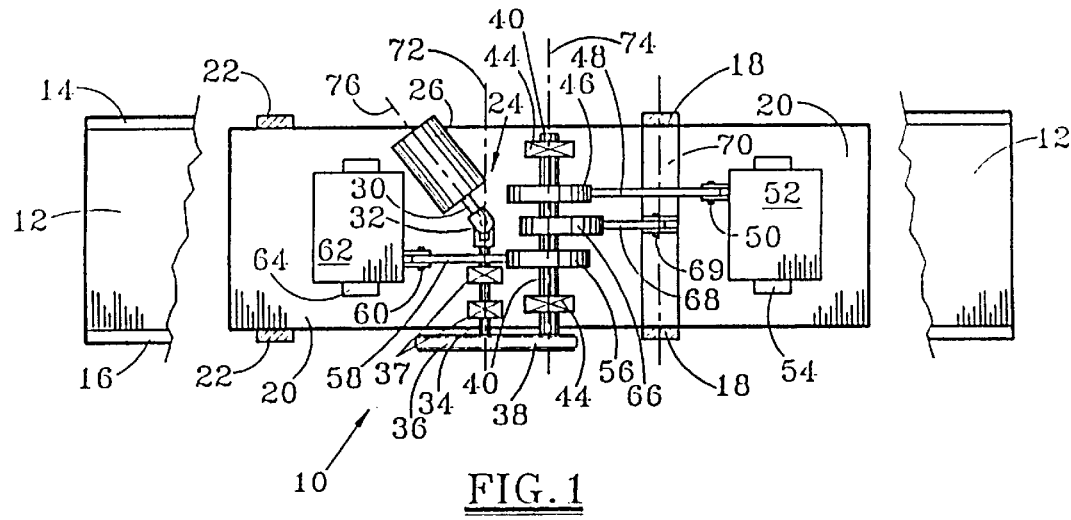
FIG. 1 is a top view of one embodiment of a differential impulse conveyor according to the present invention, with a portion of the conveyor tray removed for clarity of the drive mechanism.
Figure 2:
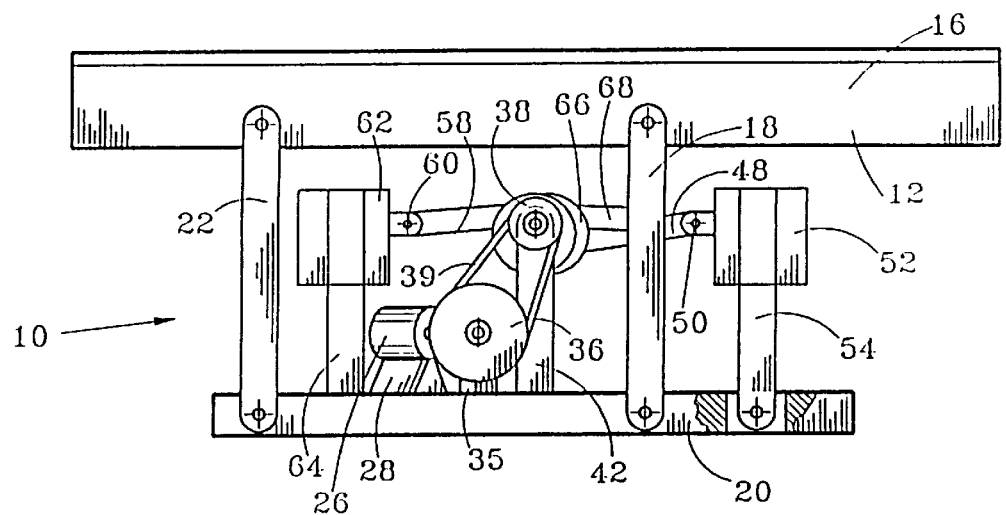
FIG. 2 is a side view of the differential impulse conveyor shown in FIG. 1.

FIGS. 1 and 2 depict one embodiment of a differential impulse conveyor 10 according to the present invention, including an elongate tray 12 powered by a drive motor 26. In the embodiment as shown in FIGS. 1 and 2, the tray 12 has a generally U-shaped cross-sectional configuration with a planar supporting surface for sliding engagement with the transported goods, and a pair of conventionally spaced sides 14, 16. It should be appreciated that the supporting surface of the tray may be slightly inclined from horizontal so that goods can be moved generally horizontally and either downhill or uphill. The conveyor tray may be designed with a spiraling tray, as disclosed in U.S. Pat. No. 5,351,807. The drive mechanisms as disclosed herein are thus applicable for driving a conveyor with a linear horizontal tray, a linear inclined tray, or a spiraling tray.

Differential impulse conveyors cause the tray 12 to move forward slow enough so that the product moves with the tray, rather than sliding on the supporting surface of the tray. The tray is then pulled backward fast enough so that the product slides on the tray. During both the slow forward and the rapid backward movement of the tray, a force in the opposite direction is applied by the drive mechanism, as explained subsequently. As the tray moves forward then backward in a rapid accelerating and decelerating fashion, slack in the drive mechanism will manifest itself as an objectionable knock.

The conveyor drive mechanism 24 comprises an electric motor 26 mounted on a motor support 28 secured to the base 20. For the embodiment as depicted in FIGS. 1 and 2, the output from the motor 26 drives a uniform or constant speed shaft 30, although the motor shaft speed may be controlled, as disclosed in U.S. Pat. No. 5,351,807, to optimize travel of goods along the tray. Another shaft 34 is angled with respect to shaft 30 and is interconnected therewith by a universal joint 32, thereby producing the desired varying rotational speed of shaft 34. As explained in the '807 patent, the angle between axis 76 of shaft 30 and axis 74 of shaft 34 may also be varied for optimizing travel of goods along the conveyor tray.

Pulley 36 is rotated by shaft 34, and belt 40 interconnects pulleys 36 and 38 to rotate shaft 40 at a speed twice that of shaft 34. Due to the action created by the universal joint, the speed of shaft 34 varies in a cyclic manner during a slow speed/fast speed cycle twice per revolution of shaft 34. The pulleys are thus sized to produce a desired single slow speed/fast speed rotation of shaft 40 during each revolution of shaft 40, so that shaft 40 rotates at a first speed during each first half cycle of rotation and at a second speed greater than the first speed during each second half cycle of rotation. Preferably the belt 40 is a cog belt or timing belt which reliably increases the speed of shaft 40 relative to shaft 34 by a 1:2 ratio to maintain the timing between rotation of motor shaft 34 and drive shaft 40.

The conveyor 10 includes a chassis or base 20, which typically has a width approximating the width of the conveyor. The tray 12 is supported on a pair of spaced apart arms 18, 22 each pivotally connected at a lower end of the base 20 and an upper end to the tray 12. Conventional rubber bushings may be used at each pivot point to minimize wear on the bearings. The shaft 34 may be mounted on conventional bearings 37 secured to the base by a suitable support, such as vertical supports 35 as shown in FIG. 2. Shaft 40 similarly is rotatably mounted on bearings 41. Conventional vertical supports 42 affix the bearings 41 to the base 20. Depending on the length of the conveyor tray, it should be understood that additional tray support arms may be utilized for supporting the tray, and that some of the support arms may be pivotally connected to floor mounting mechanisms structurally separate from the base 20.

The plurality of eccentric cranks 46, 56, and 66 are each supported on the drive shaft 40. Each crank may include a bearing hub eccentrically mounted and fixed to the drive shaft 40 and a bearing race or outer ring secured to a respective one of the crank arms 48, 58, and 68. Alternative, a crank similar to that used in a crank shaft (see FIG. 5) and a respective crank arm may be used to interconnect the drive shaft 40 and either the tray or a respective counterweight. Interconnection between the crank and the crank arm thus produces a substantially linear reciprocating motion of each crank arm and, due to the varying rotational speed of the drive shaft 40 during each revolution, produces a slow forward speed and a fast return speed of each crank arm. Crank arm 48 is connected by a conventional rubber bushing 50 to counterweight 52, which in turn is supported on a pair of counterweight supports 54 pivotally connected to the base 20. Crank arm 58 is similarly connected by rubber bushing 60 to counterweight 62, which is supported on counterweight supports 64 each pivotally connected to the base 20. Crank arm 68 interconnects crank 66 with a similar rubber bushing provided on horizontal member 70 extending between the pair of tray supports 18. Rotation of drive shaft 40 during its slow half cycle thus produces a first relatively slow forward movement of the horizontal member 70 and thus the tray 12, while a subsequent rotation of drive shaft 40 during its fast half cycle results in the more rapid turn of the horizontal support 70 and thus the tray 12, thereby sliding goods along the tray.

The drive mechanism 24 has a relatively small yet practically significant amount of slack or play therein which manifests itself as an objectionable mechanical knock in the drive mechanism. This knock is induced by the universal joint 32 as it accelerates and decelerates shaft 40. This knocking is caused by the slack in the drive train or overrunning of components, and may cause high wear and premature failure of conveyor components. This undesirable knocking is substantially or practically eliminated as a result of utilizing two counterweights 52 and 62 each also driven by the drive shaft 40 through the respective crank and crank arm. Preferably, each of the two counterweights are provided on opposing sides of the drive shaft 40, as shown in FIGS. 1 and 2.

In order to substantially reduce or eliminate the damaging knocking of the conveyor drive mechanism, cranks 46 and 56 are each positioned such that they initiate travel of each counterweight at a rotation sequence which is 120° out of phase with each other and with the travel of the tray due to the positioning of crank 66. In other words, the cranks are timed such that if the rotational position of the drive shaft 40 is 0° at the point when the crank 66 results in the furthest forward movement of the pan 12, e.g., to the right as shown in FIGS. 1 and 2, the crank 46 will produce the maximum forward travel of counterweight 52 to the right as shown in FIGS. 1 and 2 when the drive shaft 40 is at 120°, and the crank 56 will produce the maximum forward travel of the counterweight 62 to the right when the crank is at 240°. This 120° sequencing of the cranks has been shown to surprisingly result in little or no mechanical knock in the drive system. The desired weight for each of the counterweights 52 and 62 is preferably selected as a function of the weight of the tray 12 and the centers of gravity of the tray and the counterweight. The lever arm length provided by arms 18, 22 for the tray is longer than the lever arm length of the counterweight supports 54 and 64, and accordingly the weight of each counterweight 52, 54 is increased to that each counterweight has a maximum momentum which is substantially equal to the maximum momentum of the tray. The use of either one counterweight moving 180° out of phase with the tray or preferably two counterweights as disclosed herein each moving 120° out of phase with the tray thus offsets the momentum of the tray while the conveyor is running to significantly reduce or eliminate knocking.

The reason for the significant reduction in knocking of the drive mechanism by utilizing two cranks each 120° out of phase with the tray crank rather than utilizing a single counterweight 180° out of phase with the tray movement, as disclosed in the '807 patent, is not susceptible to easy explanation nor is it readily apparent. When the crank arm 68 is at its maximum acceleration, neither of the crank arms 48 or 58 is at its maximum acceleration, although the combined result of both crank arms 52 and 62 in combination with the respective counterweights neatly offsets the forces acting on the tray to provide minimal vibration or knocking in the drive system. The instantaneous acceleration of the crank arms needs to be considered in conjunction with the effect of each counterweight acceleration on the varying torque arm length due to the position of the crank arm. Since the weight of the tray 12, the counterweight 52, the counterweight 62 are each substantially equal, the effect caused by the maximal acceleration of the tray when combined with the torque arm length of the tray crank 66 at that instant of maximum acceleration is offset by the combined effect of the instantaneous acceleration of the counterweights 52 and 62 each coupled with the respective torque arm length at that time. It has been demonstrated that the knocking in the conveyor drive mechanism by utilizing two counterweights each offset by 120° from the movement of the tray substantially eliminates the undesirable knocking which existed in a similar conveyor with a single counterweight offset at 180° with respect to the tray movement.

While tests have not yet been conducted, it is at least theoretically possible that undesirable knocking of the drive mechanism for the differential impulse conveyor may be achieved by utilizing more than two counterweights. However, the benefits of utilizing three counterweights is doubtful, since one counterweight would presumably be 180° out of phase with respect to the tray movement, and the other two counterweights would each be 90° out of phase with the tray movement and would offset each other. It is possible that four counterweights may result in minimal knocking of the drive system, with each counterweight being offset from the another counterweight by 72°. Regardless of the number of counterweights, the tray crank may be positioned on the drive shaft for initiating forward movement of the tray at a selected angular position of the shaft, and each counterweight crank will initiate forward movement of a respective counterweight at a preselected offset angular position of the shaft with respect to both the selected angular position of the shaft and other of the plurality of counterweights. This preselected offset angular position of the shaft be substantially according to the relationship AO=(360°)÷(N+1), wherein AO equals the offset angular position and N equals the number of counterweights.

As a practical matter, it would be considerably more difficult to utilize four counterweights rather than two counterweights, as shown in FIGS. 1 and 2. If four counterweights are utilized, two counterweights will be presumably positioned on each side of the drive shaft. Since further complexities would be created by varying the vertical height of the counterweights with respect to the base, the embodiment with four counterweights would likely require relatively narrow counterweights so that two counterweights could be positioned side by side underneath the pan and on each side of the drive shaft, or would require a passageway through one of the counterweights for receiving a reciprocating crank arm to drive another counterweight positioned on the same side of the drive shaft. The above problems are further complicated if more than four counterweights are utilized. If an odd number of counterweights are utilized, knocking may not be minimized for reasons explained with respect to the three counterweight embodiment.

Accordingly, it is a significant feature of the invention that two counterweights are utilized, with a drive shaft spaced between the two counterweights. The tray crank 66 and the counterweight cranks 46, 56, are preferably structurally identical, and each crank arm 48, 58, and 68 preferably moving substantially within the same horizontal plane, i.e., the axis of rotation for the pivot members 69, 50, and 60 preferably is within the same horizontal plane, which also preferably includes the axis of rotation of the drive shaft 40. As a theoretical matter, the center of gravity of each counterweight could be at the same level as the center of gravity for the tray, so that the maximum momentum of each counterweight would be equal to the maximum momentum of the tray when the weight of the counterweight was equal the weight of the tray. By providing the center of gravity of each counterweight at the same elevation as the center of gravity of the tray with respect to the base from which both the tray and the counterweight are pivotably supported, the reciprocating counterweights would not impart any torque moments into the chassis or frame of the conveyor. As a practical matter, however, the counterweights 52, 62 are desirably positioned below the tray to result in a compact design for the conveyor, and the weight of each counterweight is adjusted so that the maximum momentum of each counterweight is equal to the maximum momentum of the tray, as discussed above. By positioning the counterweights at a relatively short distance rather than a substantial distance below the tray, however, the bending loads on the support arms 54, 64 and the weight of the counterweights 52, 62 are minimized. Accordingly, the center of gravity of each counterweight 52, 62 desirably is vertically closer to the center of gravity of the tray than to the vertical position of the respective pivot axis of the supports 54, 64 on the base. Preferably, the vertical spacing between the pivot axis of the support on the base and the center of gravity of each counterweight is at least 60% of the support on the base and the center of gravity of each counterweight is at least 60% of the vertical spacing between the pivot axis and the center of gravity of the tray.

It should be understood that both forward and backward motion of the tray and the counterweights 52 and 62 is controlled by the movement of the crank arms 48, 58, and 68. If desired, stops may be provided (not shown) on the base 20 for limiting pivotal movement of each of the tray supports or arms 18, 22 and the counterweight supports or arms 54, 64. These stops will not limit travel of the respective arms during operation of the differential impulse conveyor 10, but may assist in assembly of the conveyor when each of the arms 48, 58, and 68 is not interconnected between its respective crank and either the tray pivot mechanism 69 or the respective counterweight pivot mechanism 50, 60.

It should be understood that the axis 72 of the intermediate shaft 34 is parallel to the axis 74 of the drive shaft 40, although the lateral spacing between these shafts and the vertical height of the shaft 34 may be altered to accommodate different length timing belts 40. The position of the drive mechanism components between the base 20 and the tray 12 may be altered as desired for a particular application.

Figure 3:
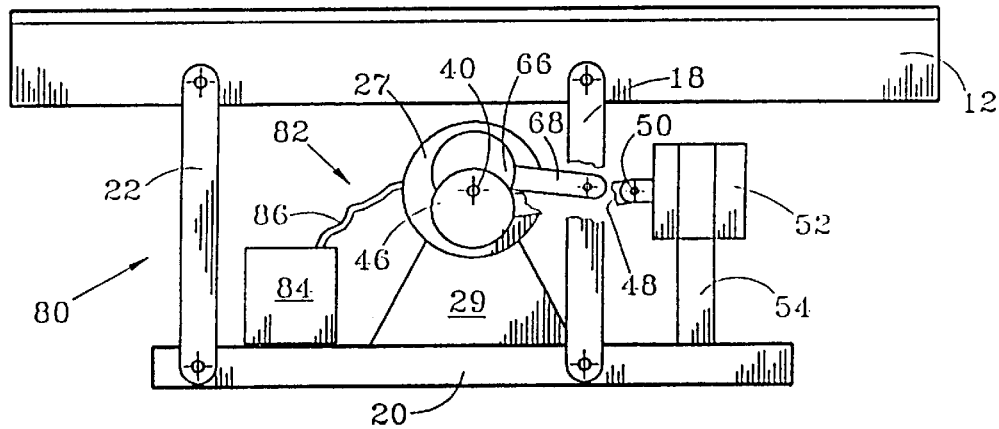
FIG. 3 is a side view of another embodiment of a differential impulse conveyor according to the present invention, wherein an electric controller is used to vary the speed of a motor shaft, and both a tray crank and a counterweight crank are connected directly to the motor shaft.

FIG. 3 depicts another embodiment of a differential impulse conveyor 80. The same reference numerals are used to depict components similar to components discussed above. An electric motor 27 is mounted on a motor support 29 to position the drive shaft 40, which is preferably also the motor shaft, at its desired elevation. The embodiment shown in FIG. 3 utilizes a controller 84 for repeatedly varying the rotational speed of the motor shaft and thus the drive shaft 40 of the motor, thereby avoiding the need for a universal joint. Conventional wires 86 thus interconnect the controller 84 and the motor 27, with the controller 84 preferably being programmed to produce the desired output for rotating the motor shaft at a first speed during each first half cycle of rotation and at a second speed greater than the first speed during each second half cycle of rotation. Drive shaft 40 rotates a crank 66, and crank arm 68 interconnects the crank with the pair of tray supports 18. The drive mechanism also includes a counterweight crank 46 and a counterweight crank arm 48 interconnected with the counterweight 52 supported on a pair of counterweight supports 54 pivotally connected to the base 20.

Since the motor 27 is controlled for directly producing the desired varying rotational speed of the drive shaft, and motor 27 serves as its own brake, and little or no dampening should be required to avoid knocking of the drive mechanism. Accordingly, the crank 46 driving the single counterweight 52 may be offset from the crank 66 by 180°. If desired, a pair of counterweights and a corresponding pair of cranks each offset from the tray crank by 120° could be utilized, as discussed above, although this second counterweight should not be necessary for the FIG. 3 embodiment since the drive mechanism does not include components which should produce any appreciable knock in the drive system. It should be understood that the controller 84 may be programmed for rotating the shaft 40 at the same speed at which the drive shaft 40 of the FIG. 1 embodiment is rotated as a result of the combined action of the universal joint and the speed enhancement created by the pulleys and timing belt. By providing a controller 84 which is programmable, the overall speed of the motor can be easily varied, and the instantaneous rotational speed of the shaft 40 may be varied as desired to optimize movement of goods along the conveyor tray. It should be understood that the controller 84 and the motor 27 may be provided as a single assembly, in which case the motor 27 may have characteristics similar to a variable speed servo motor.

Figure 4:
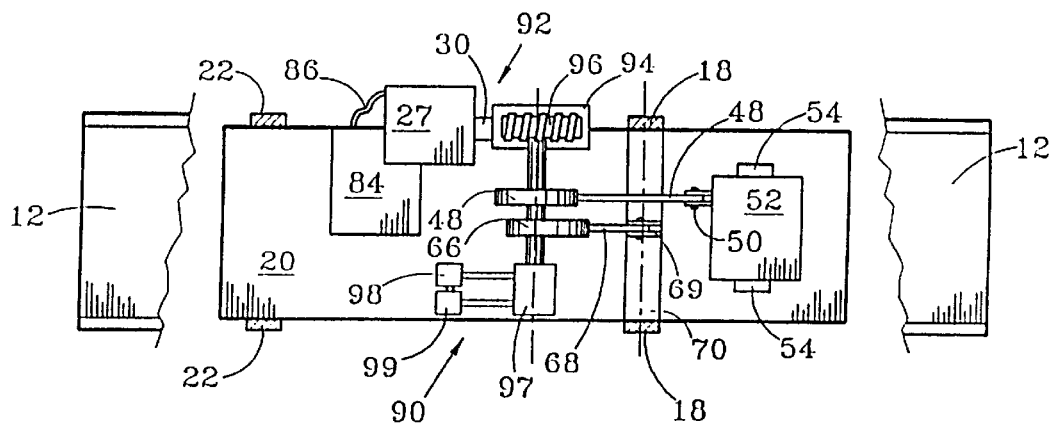
FIG. 4 is a top view of still another embodiment of the present invention, wherein a controller is used to vary the speed of a motor shaft and a wormgear mechanism interconnects the motor shaft and the drive shaft.

The drive mechanism 92 for the differential impulse conveyor as shown in FIG. 4 is similar to the embodiment as shown in FIG. 3 in that a controller 84 is used to vary the speed of the motor 27. For some applications, it may be cost prohibitive to utilize a motor which varies the speed of the motor shaft during its first half cycle at a different speed than during its second half cycle, with the overall rotational speed being in the neighborhood of approximately 200 rpm for optimum travel of the goods along the conveyor tray. For those applications wherein it is preferred to use a controller rather than a universal joint for varying the speed of the drive shaft during its half cycle, and when the cost of such a low speed motor as shown in FIG. 3 is not warranted, a speed reducer or torque multiplier may be used so that a substantially higher speed and lower cost drive motor may be employed. For applications wherein the speed of the motor shaft is varied by a controller 84, the preferred speed reducer is a wormgear drive mechanism 94, wherein the wormgear 96 is rotated by the motor shaft, and the drive shaft 40 is then rotated by the wormgear 96. A significant advantage of the speed enhancer as shown in FIGS. 1 and 2 is the relatively low cost of the pulleys and the drive belt, although the pulley and belt embodiment creates overrunning torque and mechanical knock problems. As an alternative to substantially eliminating the mechanical knocking by utilizing two counterweights, the wormgear drive mechanism 94 may be used since this type of drive mechanism has substantially zero backlash and is inherently self-locking due to its design, i.e., rotation of the drive shaft 40 practically will not cause rotation of the wormgear 96. By utilizing a wormgear drive mechanism 94, overrun loads of the drive shaft 40 are thus not transmitted back to the wormgear 96 or to the motor shaft, so that the drive mechanism is essentially a non-feedback mechanism which avoids overrunning loads. A suitable wormgear drive mechanism may also include a biasing device for smooth rotation of the output shaft relative to the input shaft. A suitable drive mechanism is the Model HU 25-2 drive mechanism available from Textron, Inc. in Traverse City, Mich.

From the above description, it should be understood that the drive motor 27 controlled by the controller 84 may allow the utilization of a lower cost drive motor 27 which may rotate, for example, the speed of approximately 1700 rpm. The desired speed reduction to achieve the rotation of the drive shaft at an average speed of approximately 200 rpm may then be obtained by utilizing a wormgear drive with 8.5:1 speed reducing function. This embodiment would require that the controller 84 be able to practically rotate the motor shaft at a first slow speed during a first rotational period of approximately 1530° shaft rotation (4¼ turns), followed by controlling the motor shaft to rotate at a second fast speed greater than the first speed during a second rotation period of 1530° shaft rotation. For some applications, it thus may be more cost effective to provide a relatively high speed motor and wormgear mechanism for reducing the variable speed of the motor shaft to the desired one half cycle slow speed rotation/one half cycle fast speed rotation desired by the drive shaft 40 than it is to directly vary the speed of the motor shaft with the controller 84 to achieve the one half cycle slow speed rotation/one half cycle fast speed rotation of the motor shaft as shown in the FIG. 3 embodiment.

It should be understood from the above description that an advantage of the FIG. 4 embodiment compared to the embodiment as shown in FIGS. 1 and 2 is that only a single counterweight 52 need be provided, since the drive mechanism does not create any appreciable knocking. It should be further understood that the drive shafts 40 for any of the embodiments discussed above may be connected with a supplemental dampening unit. Accordingly, the drive shaft 40 as shown in FIG. 4 conceptually illustrates a hydraulic pump 97 being driven by the drive shaft 40 for circulating fluid through regulatable back pressure valve 98 and then to a heat exchanger 99 before being returned back to the pump 97. The hydraulic dampening system as shown in FIG. 4 thus utilizes the torque required to rotate the pump shaft to dampen the rotation of the drive shaft, thereby still further reducing vibration and knock. Other dampening systems may use a variable magnetic load to reduce knock.

A significant advantage of the varying speed motor embodiments as shown in FIGS. 3 and 4 is that no significant dampening is required, and there is little or no backlash or slack in the drive system which needs to be offset by utilizing the pair of counterweights. Accordingly, only a single counterweight need be used for counteracting the movement of the conveyor. The drive mechanisms as shown in FIGS. 3 and 4 thus allow the motor to provide the braking function required during deceleration, and avoids the mechanical knock the drive system created with the universal joint embodiment. For many applications, however, it should be understood that the differential impulse conveyor with a conventional motor and a universal joint is preferred, in combination with the two counterweights each offset at 120° with respect to the tray movement.

Figure 5:
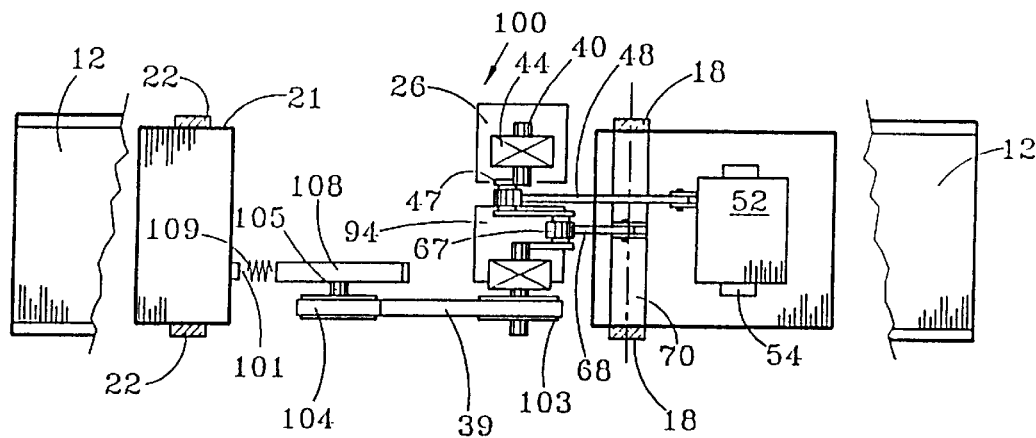
FIG. 5 is a top view of an alternate embodiment of the invention, wherein an eccentric pulley rotated by the motor shaft and a flexible belt are used to rotate the motor shaft.
Figure 6:
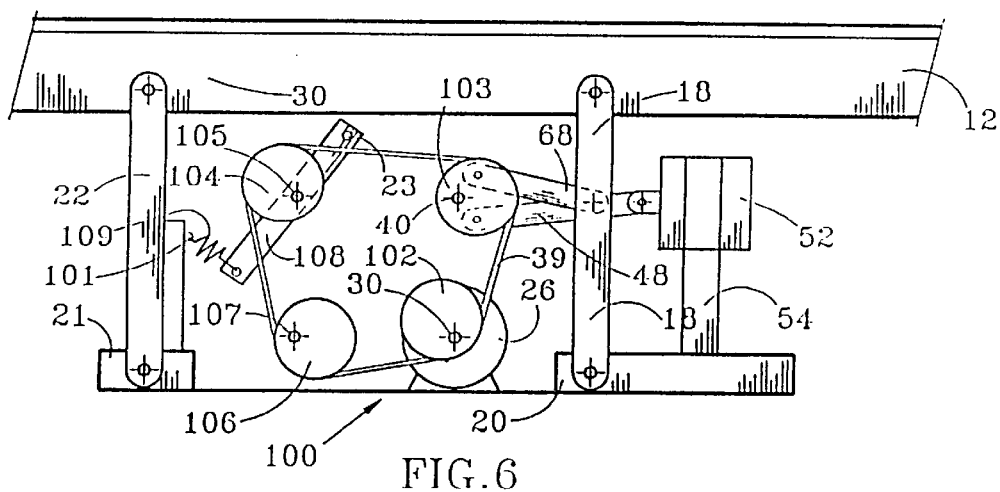
FIG. 6 is a side view of the differential impulse conveyor shown in FIG. 5.

FIGS. 5 and 6 depict another embodiment of a differential impulse conveyor 100 according to the present invention. For this embodiment, the tray is driven by a constant speed motor 26, which optionally drives a gear box 94. A suitable combination motor and gear box is the Model HM-3105 gear motor manufactured by Sumitomo. The motor shaft 30 rotates pulley 102, which is eccentrically mounted on the motor shaft 30. The drive shaft 40 is interconnected with the eccentric pulley 102 by flexible belt 39 and pulley 103, which is eccentrically mounted on shaft 40. A first make-up or idler pulley 104 is also rotated by the belt 39 and is eccentrically mounted on shaft 105. A second make-up pulley 106 is similarly rotated by belt 39 and is eccentrically mounted on shaft 107. The eccentricity of the make-up pulleys 104 and 106 is out of phase with the eccentric pulleys 102 and 103 in order to keep slack out of the drive belt 39 and maintain the desired predetermined rotation of the drive shaft 40 with the motor shaft 30, as previously explained. Those skilled in the art will appreciate that an eccentric compensator other than make-up pulleys 104 and 106 may be utilized for this purpose. The varying speed of travel of the belt 39 in combination with the eccentricity of the pulley 103 rotating the shaft 40 push the tray 12 slowly forward and then pull the tray 12 quickly backward, causing the product to be conveyed along the tray.

The axis of one of the shafts 105 and 107 may be spring-biased (or another spring-biased rotator may be driven by the belt 39) to further assist in maintaining the desired tension on the belt 39 to rotate the drive shaft in a predetermined manner with respect to the motor shaft. Arm 108 is pivotally secured about pivot 23 to one of the base components 20 or 21, and shaft 105 is rotatably mounted on arm 108 as shown. Spring 109 interconnects spring mount 101 (which is fixed to the base) and the arm 108, thereby maintaining a desired tension on the belt 39 for taking up minor movement of axis 105.

For the embodiment as shown in FIGS. 5 and 6, the axis of rotation of the shafts 30, 40, 105 and 107 are positioned on the corners of an imaginary square having a base and top surface each parallel to the sliding surface of the tray 12, with the sides of the imaginary square each being perpendicular to the tray surface. The horizontal spacing between shafts 30 and 107, the horizontal spacing between shafts 40 and 105, the vertical spacing between shafts 107 and 105, and the vertical spacing between shafts 30 and 40 are thus equal. Also, the maximum eccentricity of each pulley 102, 103, 104 and 106 with respect to each respective axis of rotation is equal. By providing four pulleys each eccentrically mounted on a respective shaft having an axis spaced at the corner of an imaginary square, substantially uniform belt tension is maintained. For some embodiments, the pivot arm 108 and spring 109 may not be necessary, in which case the shaft 105 may be rotated about an axis fixed with respect to the conveyor base.

Each of the four pulleys 102, 103, 104 and 106 thus has the same diameter, but each pulley is eccentrically mounted on its respective shaft so that the effective radius of each pulley is continually changing. The timing of pulley 103 is set with respect to pulley 102 so that the effective radius of pulley 102 is short when the effective radius of pulley 103 is long, thereby reducing the instantaneous speed of shaft 40 with respect to the constant speed shaft 30, and moving the tray 12 slowly forward. When the pulleys 102 and 103 each rotate 180°, pulley 102 has a long effective radius and pulley 103 has a short effective radius, thereby instantaneously rotating the shaft 40 faster than the shaft 30, thus quickly returning the tray 12 and sliding goods along the tray. The timing of each pulley 104 and 106 is set to offset the eccentricity of the pulleys 103 and 102, respectively. By utilizing a cog or timing belt 39, the desired timing of each pulley is uniformly maintained over a long period of conveyor operation.

Pulley 103 could be concentrically mounted on the shaft 40, but then the eccentricity of the pulley 102 and the make-up pulley or pulleys would have to be increased since only the varying speed of travel of belt 39 would then result in the varying rotational speed of the shaft 40. By eccentrically mounting both pulleys 102 and 103 on the shafts 30 and 40, respectively, the required eccentricity of the pulleys may be decreased. A single make-up pulley might also be used to compensate for the eccentricity and keep substantially uniformed tension on the timing belt 39. Two make-up pulleys are preferred, however, and are significantly more effective than a single make-up pulley to result in little if any movement of the spring-biased shaft 105. It should be understood that movement of shaft 105 is desirably very limited and it is effectively negligible in order to achieve long operating life for the conveyor. Spring biasing of shaft 105 also facilitates easy installation and, if necessary, removal and realignment of the timing belt 39 with respect to the pulleys.

FIG. 5 depicts the drive shaft 40 rotatably mounted on a pair of conventional bearings 44, which may be supported on the base 20 as previously described. Instead of utilizing bearing-type cranks as previously described, eccentric cranks as used in a conventional crank shaft are depicted in FIG. 5. The tray crank 106 is rotated by the drive shaft for reciprocating crank arm 48, which in turn reciprocates the counterweight 52. Similarly, the counterweight crank 107 driven by the shaft 40 reciprocates the tray crank arm 68, which in turn drives the member 70 interconnecting the pair of tray supports 18.

The motor shaft 30 rotates at a constant speed, either being directly driven by the motor 26 or, if desired, being driven at a constant and substantially reduced speed due to the wormgear drive mechanism 94 between the motor 26 and the eccentric pulley 102. Counterweight 52 moves in an opposite direction to the pan and cancels pan vibration, as previously described. If desired, two counterweights rather than one counterweight may be used, and this two-counterweight embodiment may be particularly advantageous when driving relatively large and thus heavy pans.

FIG. 6 illustrates the pan supports 18 and the counterweight supports 54 pivotally mounted on the base 20. The tray supports 22 are mounted on a base 21 structurally separate from base 20. Referring to FIG. 5, the tray crank arm 68 is driven by the eccentrically rotating crank 67 to reciprocate the tray 12 in the manner previously described.

Similarly, the counterweight crank arm 48 is driven by the eccentrically rotating crank 47 to drive the counterweight 52 in the opposite direction. If each of the pulleys 102, 103, 104 and 106 have the same diameter of, for example, 4 inches (10.16 cm), and if the eccentricity of each pulley 102 and 103 is 0.37 inches (1.9 cm), the ratio of the maximum rotational speed to minimum rotational speed in the drive shaft 40 will be approximately 2.2:1. By increasing eccentricity to, for example, 0.42 inches (1.08 cm) in the pulleys 102 and 103, the maximum rotational speed of the drive shaft 40 compared to the minimum rotational speed of a drive shaft 40 can be controlled to a approximate 2.4:1. While the embodiment as shown in FIGS. 5 and 6 has the benefit of simplicity, the purely cyclic rotational speed variation of the motor shaft caused by the eccentric pulley may not be as desirable as the other described embodiments to produce efficient movement of goods along the tray.

A graph may be plotted depicting pan travel in inches and pan velocity in inches per second as a function of motor position in degrees. The motor position, as used in such a graph may refer to the angular position of the motor shaft 30 for the embodiment as shown in FIGS. 1 and 2. It should be understood that the pan travel, pan velocity, pan acceleration, and torque as depicted in such a graph may be for a particular conveyor which has a pan travel of approximately 1.65 inches (4.19 cm). A longer pan travel may be desirable to move goods along the conveyor, although a longer pan travel increases the forces acting on the conveyor components, and would thus require stronger and presumably larger components.

The graph may plot pan travel as a function of motor position, and may illustrate the maximum travel at a graph peak. Pan travel is substantially zero at one point on such a graph, which represents the most retracted position for the pan. As discussed in U.S. Pat. No. 5,351,807, a negative timing angle is preferred for the universal joint embodiment, and a preferred timing angle is approximately −6°. Accordingly, the zero travel position occurs when the motor position is at about 168°. During a full 360° revolution of the motor shaft 30, the pan thus moves forward to a peak travel at a point on the graph, backward to substantially zero travel at another point on the graph, then forward again and backward again along a graph plot line. Due to the 1:2 drive mechanism provided by the pulleys 36, 38, the drive shaft 40 rotates twice for each revolution of the motor shaft 30, so that a single revolution of the drive shaft results in a single forward motion and a single return motion for the pan.

A graph may also depict pan velocity as a function of motor position. The graph plot line may illustrate that the maximum positive pan velocity of approximately 23 inches per second (584 mm/sec) occurs at a peak on the plot line, which corresponds approximately to a motor position of 19°. Maximum negative pan velocity of approximately 20 inches per second (508 mm/sec) occurs at a motor angular position of approximately 154°.

A graph plot line may also depict pan acceleration as a function of the angular position of the motor shaft. Starting at a 0° angular position, pan acceleration decreases rapidly to a maximum pan deceleration of approximately negative 29 feet per second squared (8.8 m/sec$^2$), which occurs at a point on the plot line corresponding to an angular position of approximately 37°. Pan deceleration thereafter reduces, and then again gradually increases to a point on the graph plot line. Pan acceleration then increases to a peak of approximately 84 feet per second squared (25.6 m/sec$^2$), which occurs at the motor position of approximately 177°. The graph plot line may show the rapid pan acceleration changes rapidly during the angular position of the motor shaft rotating from approximately 0° to about 20°, and again during the angular position of from about 150° to about 175°. Maximum pan acceleration occurs when pan is substantially retracted. Acceleration reduction adjacent a point on the graph plot line not necessarily desirable, but inherently occurs in the universal joint embodiment.

A graph may also depict torque in inch-pounds per pound as a function of motor position. The maximum torque occurs at a peak along the graph plot line, after which torque minimizes to a point on the graph plot line. Torque thereafter increases at another point on the plot line, and then again decreases to a maximum negative value at still another point on the graph plot line.

For a differential impulse conveyor with a pan stroke of approximately 1.65 inches, the drive shaft speed should be controlled so that the ratio of maximum to minimum rotational speed is in the range of 2.2:1 to 2.6:1. If the application requires that the goods be moved uphill at an inclination, the drive shaft speed ratio may be increased to a range of from 3.0:1 to 4.0:1.

As previously noted, the graphs as discussed above are helpful to understand the universal joint embodiment as shown in FIGS. 1 and 2. These graphs provide valuable insight, however, as to a preferred program for regulating the speed of the motor shaft for the embodiments as shown in FIGS. 3 and 4. More particularly, an ideal computer program for controller 184 would likely result in somewhat different plot lines than those as discussed above. More particularly, it would be programmed to generally follow the acceleration curve, although a bump in the curve would ideally be eliminated or significantly reduced. Accordingly, the acceleration would be substantially constant.

Figure 7:
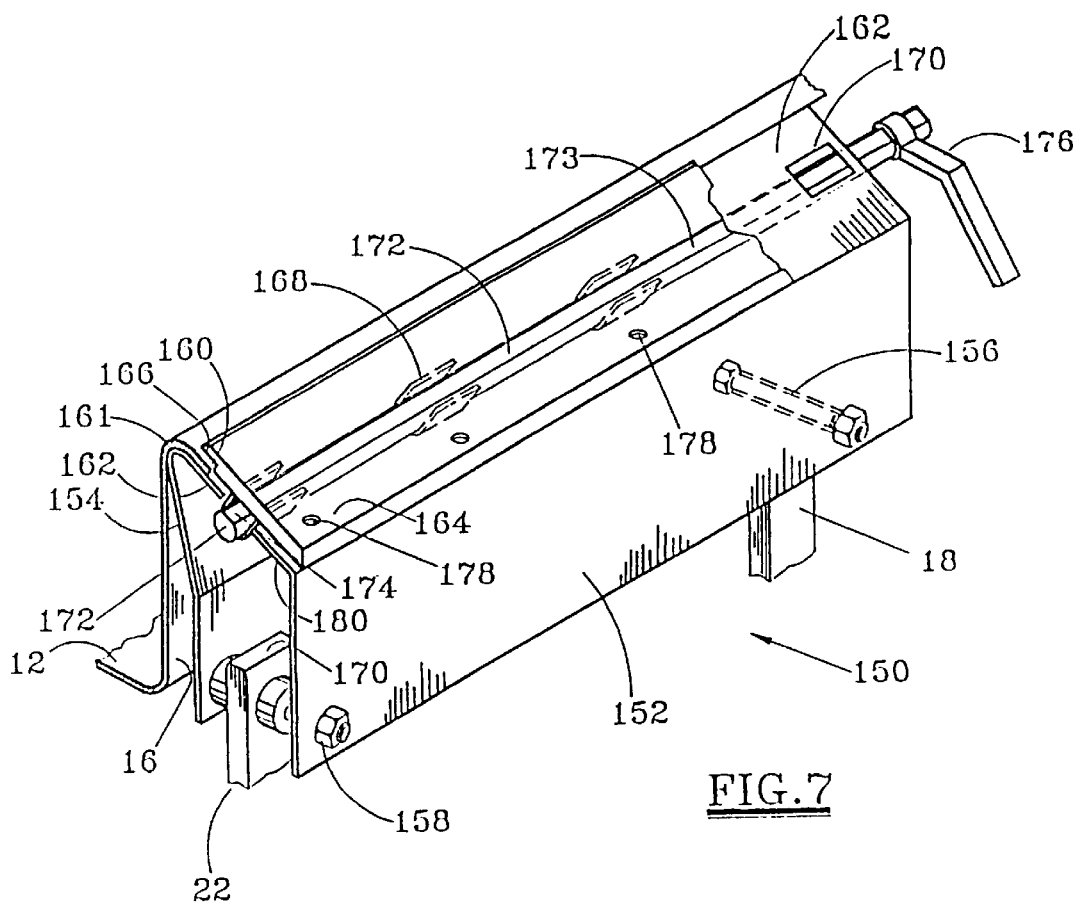
FIG. 7 is a pictorial view, partially in cross-section, illustrating a suitable connection mechanism for interconnecting the tray with a pair of support arms and allowing the tray to be moved laterally for cleaning then returned to its original position.

FIG. 7 illustrates a suitable connection mechanism 150 for interconnecting tray 12 between a pair of spaced apart supports 22 and 18. The tray 12 includes a planar generally horizontal support surface for moving goods along the tray, and vertical sides 14, 16 for containing the goods on the support surface of the tray, as previously discussed. The upper end of each tray side includes a curved lip 161, as shown in FIG. 7. The supports 22 and 18 thus support tray 12 through the connection mechanism 150 engaging the lip 161. A similar connection mechanism is used on the opposite side of the tray 12 for supporting the opposing side 14 of the tray from similar support legs 22, 18.

The connector mechanism 150 comprises a frame 152 with a tapered upper end 154 configured for engagement with rounded lip 161 of the conveyor. The frame 152 preferably includes end plates to substantially enclose the interior of the connector mechanism 150, although the left side end plate is not shown in FIG. 7 for clarity of other components discussed below. The inner and outer sides of the frame 152 and the upper ends of the supports 22, 18 each include aligned passageways 156 for receiving a bolt 158 or other conventional member for structurally mounting the connector mechanism 150 on the supports 22, 18. The connector mechanism 150 may extend between the spaced supports 18, 22 which may be approximately one meter apart, so that a long length of the clamping mechanism 150 engages the pan lip to reliably support the pan thereon. The elongate flange 160 extending outward from the rounded corner 15 of the pan 12 is configured for planar engagement with the upper inclined plate 162 of the frame 152, as shown. When the connector mechanism 150 is in its released position, the pan 12 may thus slide laterally (either in the direction of goods moving along the conveyor or in an opposing direction) with respect to the connector frame 150, and thus with respect to the supports 18, 22 and the conveyor base 20.

Clamp bar 164 is positioned on the upper surface of the frame 152. The clamp bar 164 has a plate-like configuration, with an elongate cutout 166 along its upper lower surface for receiving the pan flange 160. A plurality of rectangular shaped holes 170 are spaced along the inclined plate 162 of the frame 152 and are spaced along the length of the frame. A corresponding plurality of U-shaped strap loops 168 are welded to the lower surface of the clamp bar 164 and are sized and spaced each for fitting within a respective hole 170 in the frame 152. An elongate cam member 172 is provided for clamping and releasing the frame 152 from fixed engagement with the pan 12. The cam member comprises an elongate rod 173 having a generally cylindrical cross-sectional configuration with a flat 174 cut along the length thereof, and a handle 176 for manually rotating the rod 173. A plurality of set screws 178 are spaced intermittently along the length of the clamp bar 164, and extend downward for engagement with the inclined plate 162 to provide pivot points (together effectively providing a pivot line or pivot axis) for slightly rotating the clamp bar 164 with respect to the frame 152, as explained below.

The frame 152 may thus be mounted on the substantially vertical supports 18, 22 and the clamp bar 164 set on the frame so that the loops 168 fit within a respective hole 170. The rod 173 may then be slid beneath the inclined plate 162 and between the loops 168, with the flat 174 being parallel with the lower surface 180 of inclined plate 162. Once the tray 12 is laterally positioned at its desired location with respect to the clamping mechanism 150, the handle 176 may be manually raised or lowered so that the rod 173 rotates within the U-shaped loops 168 and brings the curved exterior surface of the rod 173 into a camming action between the loops 168 and the lower surface 180 of the inclined plate 162. This camming action effectively forces the clamp bar 154 downward, with the plurality of set screws 178 acting as a line of pivoting action. The upper end of the clamp bar 164 is thus pressed against the flange 160 of the pan 12 with a considerable force, so that the flange 160 is fixedly sandwiched between the clamp bar 164 and the frame 152, thereby securing the position of the pan 12 with respect to the supports 18, 22. The camming action of the rotating rod 173 thus secures the pan 12 by friction to the connection frame 152.

When the handle 176 turns bar 173 to its engaged or secured position, the flat 174 is angled with respect to the surface 180. In the release position, the flat 174 of the rod 173 is parallel to the lower surface 180 of inclined plate 162, as shown in FIG. 7. When the camming rod 173 is rotated to its release position, the clamp bar 164 is moved out of forced engagement with the flange 160 and the pan may be easily slid laterally with respect to the connection mechanism 150. After the conveyor drive mechanism is checked and the area beneath the operating pan is cleaned, the pan may be slid back into its original position and again secured in place by rotating the camming rod 172 to its cammed position. The clamping mechanism 150 also allows the pan to be moved laterally for achieving the optimal drop point of goods from the conveyor pan, e.g., on to a scale, then easily fixed in this position.

Those skilled in the art will appreciate that various camming mechanisms may be used for reliably securing the frame 152 to the tray 12. If desired, the configuration of the camming rod 172 may be adjusted so that the camming force between the rod 173 and the lower surface 180 of the connector frame 152 increases or decreases as a function of the angular position of the rod 173. In another embodiment, the pan may be supported on a cam rod, with a portion of the connector frame positioned above the rounded lip 161 of the pan. In this embodiment, the cam rod is rotated to a camming position which forces the pan up against the stationary frame to fix the position of the pan with respect to the frame. When the cam rod is rotated to a release position, the pan drops slightly away from the top of the connector frame, so that the pan may then be slid along the cam rod for cleaning or adjustment purposes.

Figure 8:
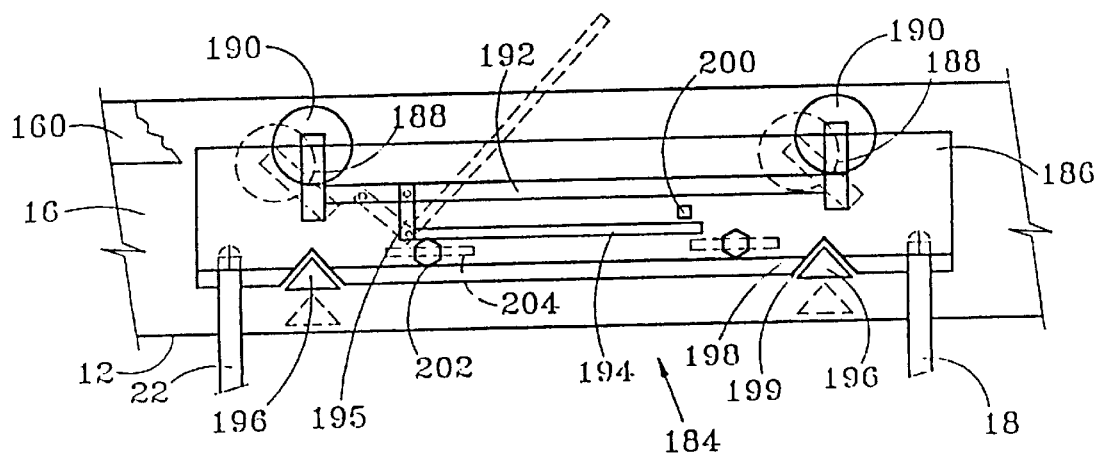
FIG. 8 is a side view illustrating another embodiment of a tray connection mechanism according to this invention for interconnecting the tray with a plurality of supports.

FIG. 8 depicts another embodiment of a connector mechanism 184 including a frame 186 mounted on the upper end of supports 18 and 22. Link members 188 are pivotally attached to the frame 186, and a roller 190 is mounted on the upper end of each link member 188 for engagement with the curved lip 161 of the pan. A connecting bar 192 interconnects the link members 188. Handle 194 is pivotally connected to the frame 186 and rotatable about axis 195, and is also interconnected with the connecting bar 192 to selectively raise and lower the rollers 190 between a pan lock position, as shown in solid lines in FIG. 10, and a pan release position, as shown in dashed lines. A pair of lugs 196 each having a triangular cross-sectional configuration are fixed to the sides of the conveyor 12. Plate 198 is positioned in back of and is adjustably mounted on the frame 186, and includes a corresponding pair of triangular-shaped cutouts 199 for receiving a respective lug 196.

When the handle 194 is in the pan secured or pan lock position, the connecting bar 192 pivots the link members 188 to be substantially vertical, thereby causing the rollers 190 to engage the curved lip 161 of the pan and raising the pan upward with respect to the frame 186 so that each lug 196 fits within its respective cutout 199 in the support plate 198. Rather than relying upon friction or a clamping action as used in the FIG. 9 embodiment, the lateral engagement and stop-type action of the lugs 196 with the support 198 is used to secure the pan 12 to the connector mechanism 184. By using the triangular lugs 196 instead of friction to propel the pan, the clamping force required by the connector mechanism is substantially reduced. Slow forward and fast return motion is thus transmitted from the arms 18, 22 to the frame 186, then to the support plate 198, then to the pair of lugs 196 for moving the pan 12. While the wheels 190 engage the curved end 116 of the pan to support the pan, the slow forward/fast turn motion is transmitted between the supports 18, 22 and the pan through the pair of lugs 196. The connector mechanism 184 may be locked into this position by providing a suitable stop 200 for engagement with the handle 194.

To move the tray 12 laterally with respect to the support arms 22 and 18, the top 200 is removed so that the handle 194 may be raised, thereby allowing the link members 188 to be tilted and thereby lowering the pan 12 with respect to the supports 18, 22. Once the triangular-shaped lugs or stops 196 move out of engagement with the respective slots 199 or similar engagement members movable with the plurality of supports 22, 18, the pan 12 is laterally movable on the pair of inclined rollers 190. At this stage, the tray 12 may thus be rolled out of position for cleaning purposes, as described above.

In order to achieve lateral adjustment of the pan 12 with respect to the supports 18, 22, the back support plate 198 is movably mounted on the frame 186. A pair of locking bolts 202 may be threaded to the support plate 198 and passed through a respective slot 204 in the frame 186. By loosening the bolts 202, the position of the support frame 198 may be laterally adjusted relative to the frame 186. When the desired lateral position of the pan 12 is achieved, the bolts 202 may be retightened, thereby fixing the position of the cutouts 199 with respect to the pan.

The connector mechanism as shown in FIGS. 7 and 8 are well suited for selectively connecting and disconnecting an impulse conveyor tray with a plurality of substantially vertical supports which input a driving motion to the conveyor tray to produce the desired slow forward/back return motion of the tray to move goods along the tray. The tray supports are preferably used both for transmitting the desired motion to the tray, and to support the tray when it is moved laterally with respect to the plurality of supports for cleaning under the tray. Alternatively, the connector mechanism may support the tray when it is driven in its slow forward/fast return motion, and rollers or guides positioned under the pan may engage the tray to support and guide the tray when it is moved laterally for cleaning. While the connector mechanisms disclosed herein are particularly intended for engaging the curved upper lips of the tray sides when the tray is being moved for cleaning, the connector mechanism could engage another flange or other suitable member secured to the tray. The connector mechanism accordingly allows the tray to be positioned as desired when in operation, the tray moved laterally out of the way for cleaning the area beneath the tray, then the tray easily returned to its original or newly adjusted position with respect to the supports.

According to the method of the invention, goods are transported by positioning a tray movable in a forward and reverse direction, with the tray preferably being pivotally supported on legs each secured at a lower end to the base and at the upper ends to the tray as disclosed herein. The rotational speed of a motor shaft is controlled to rotate the motor shaft at a first speed during a first rotational period and at a speed greater than the first speed during a second rotational period. The angular duration of this first rotational period and the second rotational period will depend upon the type of drive mechanism powering the conveyor, and more particularly on whether the drive mechanism employs a universal joint as shown in FIGS. 1 and 2, a computer controlled motor with a direct connection between the motor shaft and the cranks as shown in FIG. 3, a computer controlled motor with a speed reducer as shown in FIG. 4, or an eccentric pulley and belt arrangement as shown in FIGS. 5 and 6. In either event, the motor shaft and the tray are interconnected, one or more counterweights each movable relative to the tray are provided, and the motor shaft and each of the one or more counterweights are interconnected.

The method of the this invention thus utilizes a drive motor to move a tray in a forward direction and a backward direction, wherein the motor rotates a drive shaft at a first speed during each first half cycle of rotation and a second speed greater than the first speed during each second half cycle of rotation. For many embodiments, including particularly embodiments utilizing a universal joint in the drive mechanism, a plurality of counterweights are supported each movable relative to the tray. The drive shaft and each of the plurality of counterweights are interconnected to initiate forward movement of the respective counterweight at a preselected angular position of the drive shaft with respect to both the selected angular position of the shaft which initiates forward movement of the tray and with respect to other of the plurality of counterweights. Preferably first and second counterweights are provided each on opposing sides of the drive shaft, in which case the first counterweight crank interconnects the drive shaft with a first counterweight at an offset angle of approximately 120 with respect to a selected angular position of the drive shaft, and the second counterweight crank interconnects the drive shaft and the second counterweight in an offset angular position of approximately 240° with respect to the selected angular position of the drive shaft.

The embodiments described above power the tray by an electric motor. Those skilled in the art will recognize that the motor element may be fulfilled by various means. For some applications, a hydraulically powered motor or an electrically controlled servo motor may be preferred. Also, the mechanical interconnection between the drive shaft and the supports for the tray or the counterweights have been described herein as an eccentric crank and crank arms. Any of the embodiments disclosed herein may use either the eccentric bearing-type crank or a crankshaft-type crank. Other crank interconnections between the drive shaft and these driven components may also be used to achieve the desired reciprocating motion in response to the variable drive shaft speed. The proper profile of a cam rotated by a constant speed shaft and cooperating with a spring-biased cam follower secured to a crank arm may be able to produce the desired slow forward/fast return motion of the conveyor tray. The drive mechanisms shown in FIGS. 1–6 are preferred at this time due to their simplicity and high reliability. Although the same rubber bushings may be used on the tray support arms 18, 22, the counterweight support arms 54, 64, and the bushings 50, 60 and 69 at the ends of the crank arms 48, 58 and 68, various types of bushings or bearings may be used instead of rubber bushings. Also, linear bearing members other than support arms may be used to support the tray and/or one or more of the counterweights on a common base or on structurally separate bases. The pair of counterweights may be used with any embodiment, but are not required for the FIGS. 3–6 embodiments. The tray may have various configurations, depending on the application.

Various other modifications to the differential impulse conveyor and to the method of powering a conveyor as disclosed herein should be apparent from the above description of preferred embodiments. Although the invention has thus been described in detail for these embodiments, it should be understood that this explanation is for illustration, and that the invention is not limited to these embodiments. Alternate components and operating techniques will be apparent to those skilled in the art in view of this disclosure. Additional modifications are thus contemplated and may be made without departing from the spirit of the invention, which is defined by the claims.

What is claimed is:

1. A differential impulse conveyor for transporting goods, comprising:
    a conveyor tray movable in a forward direction at a first speed and in a backward direction at a second speed greater than the first speed to move the goods along the tray;
    a drive mechanism for moving the conveyor tray in the forward direction and the backward direction;
    a plurality of tray supports supporting the conveyor tray during movement by the drive mechanism;
    a locking member for selectively connecting the conveyor tray with the plurality of tray supports;
    a release member for deactivating the locking member; and
    a guide mechanism for guiding movement of the conveyor tray with respect to the plurality of tray supports when the release member deactivates the locking member.

2. The differential impulse conveyor as defined in claim 1, further comprising:

the conveyor tray including an elongate flange extending outward from a side of the tray; and the plurality of tray supports including a pair of pivot arms each pivotally connected to a base, at least one of the pivot arms having a pivot arm upper end engaging the elongate flange and functioning as the guide mechanism to guide movement of the conveyor tray with respect to the plurality of tray supports.

3. The differential impulse conveyor as defined in claim 2, wherein the locking member comprises a clamp bar for forced engagement with the elongate flange of the conveyor tray.

4. The differential impulse conveyor as defined in claim 2, wherein the guide mechanism includes an upper inclined plate for sliding movement of the elongate flange of the conveyor tray when the release member is deactivated.

5. The differential impulse conveyor as defined in claim 1, wherein the locking member comprises:

one or more stops each secured to the conveyor tray; and one or more engagement members movable with the plurality of tray supports for selective engagement with the one or more stops to connect the conveyor tray to the plurality of tray supports.

6. The differential impulse conveyor as defined in claim 1 wherein the guide mechanism further comprises:

a plurality of rollers for supporting the conveyor tray and facilitating movement of the conveyor tray with respect to the plurality of tray supports when the release member is deactivated.

7. The differential impulse conveyor as defined in claim 1, further comprising:

one or more counterweights each movable relative to the conveyor tray and driven by the drive mechanism.

8. The differential impulse conveyor as defined in claim 1, further comprising:

an adjustment mechanism for selectively adjusting the position of the conveyor tray relative to the plurality of tray supports when the locking member connects the conveyor tray with the plurality of tray supports.

9. A conveyor for transporting goods, comprising:

a conveyor tray movable in a forward direction and in a backward direction to move the goods along a floor of the tray;

a drive mechanism for moving the conveyor tray in the forward direction and the backward direction;

one or more of tray supports for supporting the conveyor tray during movement by the drive mechanism;

a connector mechanism secured to the one or more tray supports for selectively connecting the conveyor tray with the one or more tray supports; and a guide mechanism for guiding movement of the conveyor tray with respect to the one or more tray supports when the conveyor tray is disconnected from the one or more tray supports.

10. The conveyor as described in claim 9, further comprising:

a plurality of counterweights each movable relative to the conveyor tray; and a plurality of counterweight cranks each interconnecting the drive mechanism and a respective one of the plurality of counterweights, each counterweight crank initiating forward and backward movement of a respective counterweight at a preselected time relative to forward and backward movement of the conveyor tray.

11. The conveyor as defined in claim 9, further comprising:

the conveyor tray including an elongate flange extending outward from a side of the conveyor tray; and the guide mechanism being supported on and extending between the one or more tray supports for engaging the elongate flange to guide movement of the conveyor tray with respect to the one or more tray supports.

12. The conveyor as defined in claim 11, wherein the connector mechanism comprises a clamp bar for forced engagement with the elongate flange of the conveyor tray.

13. The conveyor as defined in claim 11, wherein the guide mechanism includes an upper inclined plate for sliding movement of the elongate flange of the conveyor tray when the conveyor tray is disconnected from the one or more tray supports.

14. The conveyor as defined in claim 9, wherein the connector mechanism comprises:

one or more stops each secured to the conveyor tray; and one or more engagement members movable with the plurality of tray supports for selective engagement with the one or more stops to connect the conveyor tray to the plurality of tray supports.

15. The differential impulse conveyor as defined in claim 9 wherein the guide mechanism further comprises:

a plurality of rollers for supporting the conveyor tray and facilitating movement of the conveyor tray with respect to the plurality of tray supports when the conveyor tray is disconnected from the one or more tray supports.

16. The conveyor as defined in claim 9, further comprising:

an adjustment mechanism for selectively adjusting the position of the conveyor tray relative to the one or more tray supports when the connector mechanism connects the conveyor tray with the one or more tray supports.

17. The conveyor as defined in claim 9, further comprising:

one or more counterweights each movable relative to the conveyor tray and driven by the drive mechanism.

18. A conveyor for transporting goods, comprising:

a conveyor tray powered in a forward direction and in a backward direction to move goods along a floor of the tray;

a drive mechanism moving the conveyor tray in the forward direction and the backward direction;

a plurality of tray supports supporting the conveyor tray during movement by the drive mechanism;

a connector mechanism secured to the plurality of tray supports for selectively connecting the conveyor tray with the plurality of tray supports; and a guide mechanism guiding movement of the conveyor tray with respect to the plurality of tray supports when the conveyor tray is disconnected from the plurality of tray supports.

19. The conveyor as described in claim 18, further comprising:

a plurality of counterweights each movable relative to the conveyor tray by the drive mechanism.

20. The conveyor as defined in claim 18, wherein the connector mechanism comprises a clamp bar for forced engagement with the conveyor tray.

21. The conveyor as defined in claim 18, further comprising:

the conveyor tray including an elongate flange extending outward from a side of the conveyor tray; and the guide mechanism engaging the elongate flange to guide movement of the conveyor tray with respect to the plurality of tray supports.

* * * * *